(12) United States Patent
Maruta

(10) Patent No.: US 7,986,373 B2
(45) Date of Patent: Jul. 26, 2011

(54) PLASMA TELEVISION AND PANEL TYPE TELEVISION

(75) Inventor: Naoto Maruta, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 1301 days.

(21) Appl. No.: 11/592,061

(22) Filed: Nov. 2, 2006

(65) Prior Publication Data

US 2007/0103605 A1 May 10, 2007

(30) Foreign Application Priority Data

Nov. 4, 2005 (JP) ................................ 2005-009240

(51) Int. Cl.
*H04N 3/14* (2006.01)
(52) U.S. Cl. ......... 348/836; 348/843; 348/839; 348/794
(58) Field of Classification Search .......... 348/836–842; 312/7.2; 248/917
See application file for complete search history.

(56) References Cited

U.S. PATENT DOCUMENTS

| | | | | |
|---|---|---|---|---|
| 6,480,243 B2 * | 11/2002 | Yamamoto | ..................... | 348/836 |
| 6,807,051 B2 * | 10/2004 | Takahashi | ................. | 361/679.23 |
| 7,070,156 B2 * | 7/2006 | Liao | ................ | 248/466 |
| 7,529,082 B2 * | 5/2009 | Maruta | ......................... | 312/7.2 |
| 2005/0237438 A1 * | 10/2005 | Maruta | ......................... | 348/797 |
| 2006/0292723 A1 | 12/2006 | Fukui | | |
| 2007/0090734 A1 * | 4/2007 | Maruta | ...................... | 312/223.2 |
| 2007/0091223 A1 * | 4/2007 | Maruta et al. | .................. | 349/58 |

FOREIGN PATENT DOCUMENTS

| | | |
|---|---|---|
| JP | 10-240155 | 9/1998 |
| JP | 2001-305982 | 11/2001 |
| JP | 2003-173150 | 6/2003 |
| JP | 2003-186412 | 7/2003 |
| JP | 2004-118085 | 4/2004 |
| JP | 2005-308794 | 11/2005 |
| WO | WO2005/022493 A | 3/2005 |

OTHER PUBLICATIONS

The extended European search report, pursuant to Rule 44a EPC dated Jan. 26, 2007, searched on Jan. 18, 2007.

* cited by examiner

*Primary Examiner* — Eileen Lillis
*Assistant Examiner* — Alp Akbasli
(74) *Attorney, Agent, or Firm* — Yokoi & Co., U.S.A., Inc.; Toshiyuki Yokoi

(57) ABSTRACT

An upper left protruding section 63a, an upper right protruding section 63b, a lower left protruding section 64a, and a lower right protruding section 64b are provided at vertically extending bridge frames 60, and an upper left screw-fixation section 65a, an upper right screw-fixation section 65b, a lower left screw-fixation section 66a, and a lower right screw-fixation section 66b are formed by causing the respective protruding sections to be bent, so that it is possible to cause the vertically extending bridge frames 60 to be screw-fastened directly to a back face of a PDP module 30. Accordingly, it is possible to reduce the number of parts, save the labor of assembling work, reduce the mounting defects, and cut costs.

3 Claims, 7 Drawing Sheets

PLASMA TELEVISION AND PANEL TYPE TELEVISION

CROSS-REFERENCES TO RELATED APPLICATIONS

The present application is related to the Japanese Utility Model Application No. 2005-009240, filed Nov. 4, 2005, the entire disclosure of which is expressly incorporated by reference herein.

BACKGROUND OF THE INVENTION (1) Field of the Invention

This invention relates to a plasma television and a panel type television.

(2) Description of the Related Art

Referring now to FIG. 7, a conventional plasma television having a plasma display panel (PDP) module will be discussed hereinafter in order to facilitate understanding of the present invention. In the conventional plasma television of FIG. 7, a pair of vertically spaced apart spacers 92 and a pair of vertically spaced apart lower spacers 92 are arranged on the left and right sides of a back face of the PDP module 90, and two vertically extending bridge frames 93 are arranged on the upper and lower spacers 92 so as to be spaced apart at a predetermined interval from each other in the lateral direction, and screw-fastened to the spacers 92. Upper and lower ends of the vertically extending bridge frames 93 are screw-fastened to a rectangular frame (not shown) which is attached to the PDP module 90 so as to surround the PDP module 90 on all sides including upper, lower, left and right sides of the PDP module 90.

Japanese Patent Application Laid-Open No. 2001-305982 discloses a method for mounting a display panel of a number of kinds for an information processing apparatus such as a notebook personal computer, in a common display panel housing, and such a display panel housing. The display panel housing has a storage case. The method comprises the steps of inserting the display panel in the storage case, providing a first spacer between a back face of the display panel and an inner face of the storage case, providing a second spacer between an inner surface of a lower portion of the storage case and an outer surface of a lower portion of the display panel, the second spacer serving as means to cause the display panel to be fixed at a lower position when the display panel housing is opened, and causing a holding member for holding at least two portions of the display panel, to be fixed to the storage case, thus enabling a display panel of a number of kinds, which is different in any of shape, thickness, size and the like, to be mounted in the common display panel housing without changing the display panel housing.

Moreover, Japanese Patent Application Laid-Open No. 2004-118085 discloses a stand for a PDP which is applicable to PDPs different in size. Japanese Patent Application Laid-Open No. 2003-173150 discloses a structure which facilitates common use of a circuit substrate and a connection element which perform the same function in a plasma display device, even if the inch-size of the plasma display device is changed.

Again referring to FIG. 7, in the conventional plasma television, six components which include the two vertically extending bridge frames 93 arranged on the left and right sides of the back face of the PDP module 90 and the four spacers 92 are required. Mounting of these six components to the PDP module 90 is carried out by causing the four spacers 92 to be arranged on the back face of the PDP module 90, causing the spacers 92 to be screw-fastened to the back face of the PDP module 90, causing the two vertically extending bridge frames 93 to be arranged on the spacers 92, and causing the vertically extending bridge frames to be screw-fastened to the spacers 92. This will take a great deal of trouble. In addition, plural threaded-holes are inevitably required to be formed in the spacers 92 in order that the spacers can be applied to various PDPs which are supplied by many panel makers. This will contribute to reduction of work efficiency at the time of assembling and also contribute to mounting defects. Moreover, the spacers are generally made of relatively expensive nylon resins, so that it is hard to cut costs.

BRIEF SUMMARY OF THE INVENTION

The present invention has been made with a view to overcoming the foregoing problems of the prior art televisions.

The present invention discloses a panel type television and a plasma television in which the number of parts thereof is reduced and which facilitate saving of the labor of mounting works, reducing of mounting defects and cutting of costs.

One aspect of the present invention provides plasma television which comprises a plasma display panel module displaying an image on a screen thereof, a speaker outputting voice, a main substrate for receiving of television broadcast signals, causing the image to be displayed on the screen of the plasma display panel module, and causing the voice to be outputted from the speaker, a cabinet for housing the plasma display panel module and the speaker, the cabinet having a substantially rectangular window portion for allowing the screen of the plasma display panel module to be exposed therethrough, a rectangular frame for supporting the plasma display panel module, the rectangular frame having a forward projecting peripheral step portion, and the rectangular frame being fixed to the plasma display panel module so as to surround the plasma display panel module on all sides including upper, lower, right and left sides of the plasma display panel module, with the peripheral step portion thereof being engaged with a peripheral edge portion of a front face of the plasma display panel module, two vertically extending bridge frames each formed into a substantially U-shape in cross-section by bending a metallic plate, and formed in a rear side surface thereof with holes in which wall-mounting kits are to be fitted, the vertically extending bridge frames being arranged on the left and right sides of a back face of the plasma display panel and fixed at upper and lower end portions thereof to upper and lower ends of the rectangular frame, and spacers arranged between the back face of the plasma display panel module and the vertically extending bridge frames, each of the vertically extending bridge frames comprising upper fixing sections formed by causing left and right sides of an upper portion of a vertically extending bridge frame to be inwardly bent so as to be substantially parallel to the back face of the plasma display panel module, the upper fixing sections being formed with threaded holes through which the upper portion of the vertically extending bridge frame is fixed to the upper end of the rectangular frame, lower fixing sections formed by causing left and right sides of a lower portion of the vertically extending bridge frame to be inwardly bent so as to be substantially parallel to the back face of the plasma display panel module, the lower fixing sections being formed with threaded holes through which the lower portion of the vertically extending bridge frame is fixed to the lower end of the rectangular frame, an upper left protruding section formed by causing a first region of a left side of the vertically extending bridge frame to be cut and causing the first region of the left side to rise up so as to be substantially perpendicular to the left side, an upper right protruding section formed by causing a second region of a right side of the vertically extending bridge frame to be cut and causing the second region of the right side to rise up so as to be substantially perpendicular to the right side, a lower left protruding section formed by causing a third region of the left side of the vertically extending bridge frame to be cut and causing the third region of the left side to rise up so as to be substantially perpendicular to the left side, a lower right protruding section formed by a causing a fourth region of the right side of the vertically extending bridge frame to be cut and causing the fourth region of the right side to rise up so as to be substantially perpendicular to the right side, an upper left screw-fixation section formed by causing the upper left protruding section to be bent downwardly so as to be substantially parallel to the back face of the plasma display panel module, the upper left screw-fixation section being formed with a first threaded hole means, an upper right screw-fixation section formed by causing the upper right protruding section to be bent downwardly so as to be substantially parallel to the back face of the plasma display panel module, the upper right screw-fixation section being formed with a second threaded hole means, a lower left screw-fixation section formed by causing the lower left protruding section to be bent upwardly so as to be substantially parallel to the back face of the plasma display panel module, the lower left screw-fixation section being formed with a third threaded hole means, a lower right screw-fixation section formed by causing the lower right protruding section to be bent upwardly so as to be substantially parallel to the back face of the plasma display panel module, the lower right screw-fixation section being formed with a fourth threaded hole means, and projections for positioning the vertically extending bridge frame and retaining the spacers inserted between the vertically extending bridge frame and the back face of the plasma display panel module, the projections being provided at the upper left screw-fixation section, the upper right screw-fixation section, the lower left screw-fixation section and the lower right screw-fixation section so as to project substantially perpendicularly to the back face of the plasma display panel module, the first and third threaded hole means each comprising one of a group of first plural threaded round holes and a second threaded oblong hole, and the second and fourth threaded hole means each comprising the other of the group of first plural threaded round holes and the second threaded oblong hole.

Another aspect of present invention provides a panel type television which comprises a plasma display panel, a rectangular frame for supporting the plasma display panel, the rectangular frame being fixed to the plasma display panel so as to surround the plasma display panel on all sides including upper, lower, right and left sides of the plasma display panel, and two vertically extending bridge frames each formed into a substantially U-shape in cross-section by bending a metallic plate, the vertically extending bridge frames being fixed at upper and lower end portions thereof to upper and lower ends of the rectangular frame, each of the vertically extending bridge frames comprising upper fixing sections formed by causing left and right sides of the upper portion of a vertically extending bridge frame to be inwardly bent so as to be substantially parallel to the back face of the plasma display panel, the upper fixing sections being formed with threaded holes through which the upper portion of the vertically extending bridge frame is fixed to the upper end of the rectangular frame, lower fixing sections formed by causing left and right sides of the lower portion of the vertically extending bridge frame to be inwardly bent so as to be substantially parallel to the back face of the plasma display panel, the lower fixing sections being formed with threaded holes through which the lower portion of the vertically extending bridge frame is fixed to the lower end of the rectangular frame, an upper left protruding section formed by causing a first region of a left side of the vertically extending bridge frame to be cut and causing the first region of the left side to rise up so as to be substantially perpendicular to the left side, an upper right protruding section formed by causing a second region of a right side of the vertically extending bridge frame to be cut and causing the second region of the right side to rise up so as to be substantially perpendicular to the right side, a lower left protruding section formed by causing a third region of the left side of the vertically extending bridge frame to be cut and causing the third region of the left side to rise up so as to be substantially perpendicular to the left side, a lower right protruding section formed by a causing a fourth region of the right side of the vertically extending bridge frame to be cut and causing the fourth region of the right side to rise up so as to be substantially perpendicular to the right side, an upper left screw-fixation section formed by causing the upper left protruding section to be bent downwardly so as to be substantially parallel to the back face of the plasma display panel, the upper left screw-fixation section being formed with a first threaded hole means, an upper right screw-fixation section formed by causing the upper right protruding section to be bent downwardly so as to be substantially parallel to the back face of the plasma display panel, the upper right screw-fixation section being formed with a second threaded hole means, a lower left screw-fixation section formed by causing the lower left protruding section to be bent upwardly so as to be substantially parallel to the back face of the plasma display panel, the lower left screw-fixation section being formed with a third threaded hole means, and a lower right screw-fixation section formed by causing the lower right protruding section to be bent upwardly so as to be substantially parallel to the back face of the plasma display panel, the lower right screw-fixation section being formed with a fourth threaded hole means.

The vertically extending bridge frames are screw-fastened to the back face of the plasma display panel through the threaded-hole means formed in the upper left screw-fixation section, the upper right screw-fixation section, the lower left screw-fixation section and the lower right screw-fixation section, and are screw-fastened to the rectangular frame through the threaded-holes which are formed in the upper and lower fixing sections. Thus, the plasma display panel is interposedly supported by the rectangular frame and the vertically extending bridge frames.

According to the present invention, the protruding sections are provided at the vertically extending bridge frames and the screw-fixation sections are formed by causing the protruding sections to be bent, so that it is possible to cause the vertically extending bridge frames to be screw-fastened directly to the back face of the PDP module. This will enable the number of parts to be considerably reduced from six to two, enable the labor of assembling work to be saved, and enable the mounting defects to be reduced. Moreover, spacers which are made of expensive nylon resins are not required, thus cutting costs. Therefore, according to the present invention, it is possible to provide an inexpensive panel type television.

An optional aspect of present invention provides a panel type television, wherein the first and third threaded hole means each comprise one of a group of first plural threaded round holes and a second threaded oblong hole, and the second and fourth threaded hole means each comprise the other of the group of first plural threaded round holes and the second threaded oblong hole.

That is, if each of the first and third hole means formed in the upper left screw-fixation section and the lower left screw-fixation section, respectively, comprises plural threaded round-holes, each of the second and fourth hole means formed in the upper right screw-fixation section and the lower right screw-fixation section, respectively, comprises a threaded oblong hole extending laterally. Also, if each of the second and fourth hole means formed in the upper right screw-fixation section and the lower right screw-fixation section, respectively, comprises plural threaded round-holes, each of the first and third hole means formed in the upper left screw-fixation section and the lower left screw-fixation section, respectively, comprises an oblong threaded-hole extending laterally. This enables mounting of a display panel of a number of kinds to be performed by utilizing the same vertically extending bridge frames, even if the display panel is designed by a panel maker such that a mounting position of the display panel is varied. Therefore, it is unnecessary to prepare vertically extending bridge frames which are exclusive per display panel which is supplied by the panel maker, so that it is possible to cut costs and provide a more inexpensive panel type television.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

An embodiment according to the present invention will be discussed hereinafter in the following order.

(1) Structure of a panel type television;
(2) Structure of a vertically extending bridge frame; and
(3) Summary.

(1) STRUCTURE OF A PANEL TYPE TELEVISION

Figure 1:
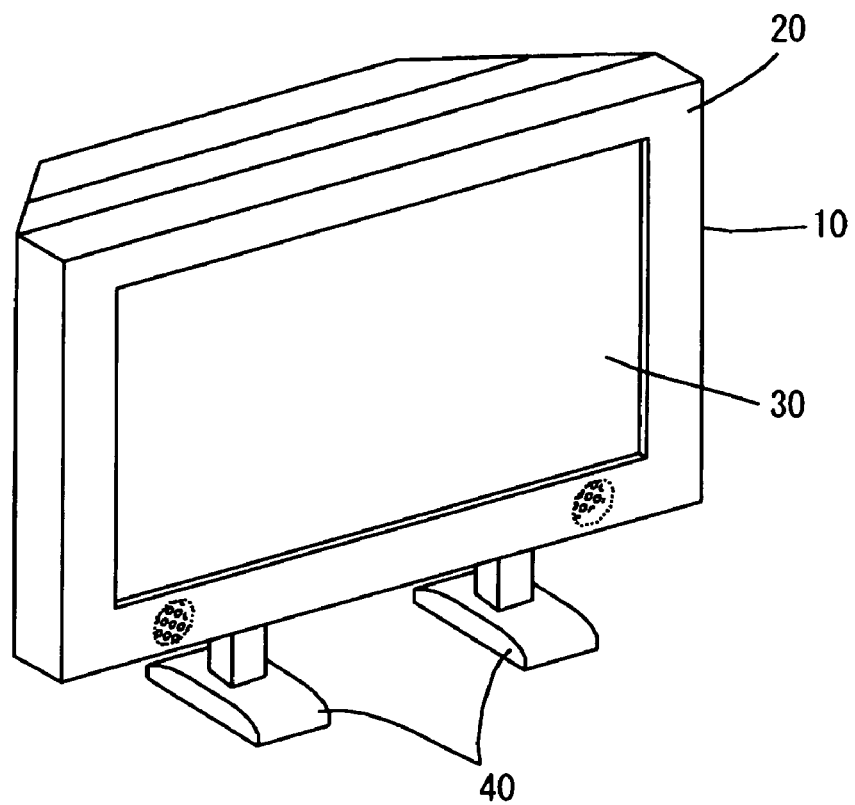
FIG. 1 is an exemplary illustration of a schematic perspective view of a panel type television according to the present invention, as viewed from a front side.

Referring to FIG. 1, there is illustrated a panel type television 10, as viewed from an oblique front side, which employs a plasma display panel (PDP) module. In the illustrated example, a cabinet means 20 comprises a thin housing which has a substantially rectangular shape extending laterally. The cabinet housing comprises a front cabinet member having a substantially rectangular opening formed in a front surface thereof, and a rear cabinet member applied to the front cabinet member from a rear side of the front cabinet member and mounted to the front cabinet member.

Left and right leg portions 40 for allowing the entire panel type television 10 to stand up and supporting the entire panel type television 10 are projected downward from an interior of the cabinet means 20. The cabinet means 20 has openings formed in left and right regions of a lower end portion of the front surface thereof for allowing voice from an unshown speaker to be outputted forwardly of the panel type television 10.

Figure 2:
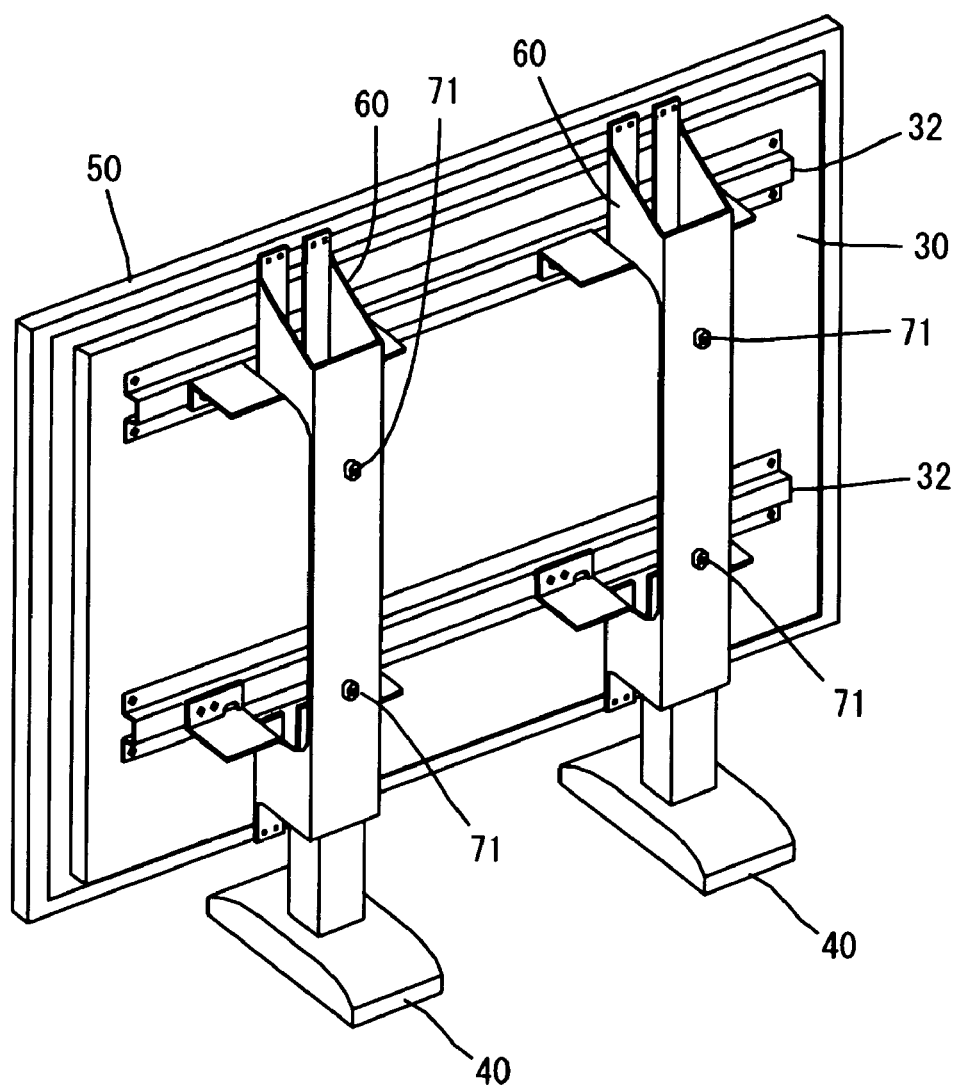
FIG. 2 is an exemplary illustration of a schematic perspective view of the panel type television as viewed from a back side, in which a cabinet of the panel type television is removed.

Referring to FIG. 2, there is illustrated the panel type television 10 as viewed from an oblique rear side, in which the cabinet means 20 is removed. In the illustrated example, two vertically spaced apart mounting members 32 are provided on a back face of the PDP module 30 so as to extend substantially horizontally, and a rectangular frame 50 is fixed to the PDP module 30 so as to surround the PDP module 30 on all sides including upper, lower, left and right sides of the PDP module 30. Moreover, two vertically extending bridge frames 60 are arranged on the back face of the PDP module 30 so as to be laterally spaced apart from each other, and screw-fastened to the mounting members 32 so as to extend substantially vertically.

The vertically extending bridge frames 60 are formed with threaded holes in upper and lower ends thereof and screw-fastened to upper and lower end portions of the rectangular frame 50 through the threaded holes, whereby the rectangular frame 50 is reinforced. The rectangular frame 50 is provided with a peripheral step portion (not shown) which project forwardly. The PDP module 30 is held from the front side by causing the peripheral step portion of the rectangular frame 50 to be engaged with a peripheral edge portion of the front face of the PDP module 30, and is held from the rear side by means of the vertically extending bridge frames 60, whereby the PDP module 30 is firmly secured by the rectangular frame 50 and the vertically extending bridge frames 60.

The lower end portions of the vertically extending bridge frames 60 are each bent and formed into a substantially U-shape in cross-section. Frames which have each a substantially U-shape in cross-section are attached to inner sides of the bent lower end portions of the vertically extending bridge frames 60 so as to extend downward. Substantially rectangular flat-plates which come in surface-contact with a floor are provided at lower ends of the substantially U-shaped frames. The U-shaped frames and the flat plates constitute the leg portions 40. The leg portions 40 extend downwardly, are projected outwardly of the cabinet means, support the entire panel type television 10 and serve to allow the entire panel type television 10 to stand up.

Moreover, in order that the panel type television 10 can be used as a wall-mounted television, the vertically extending bridge frames 60 are provided with means for facilitating mounting of the panel type television 10 to a wall. The mounting-facilitating means comprises two holes 71 which are formed in a rear side surface of each of the vertically extending bridge frames 60. When the panel type television 10 is used as the wall-mounted television, wall-mounting kits are fitted in the holes 71.

Figure 3:
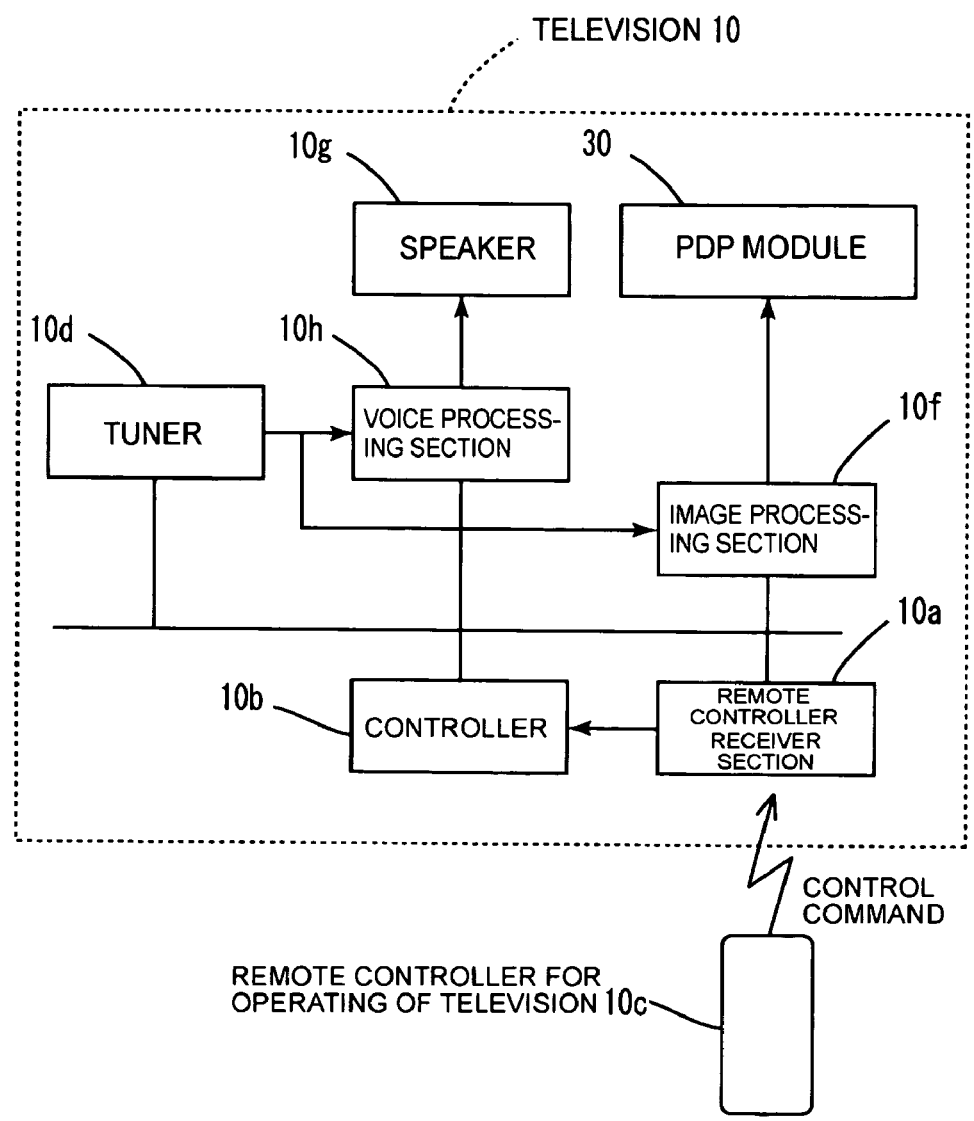
FIG. 3 is an exemplary illustration of a block diagram exhibiting a schematic structure of the panel type television.

Referring to FIG. 3, there is exhibited a block diagram which is of assistance in explaining a schematic structure of the panel type television 10. In the illustrated example, the panel type television 10 includes a body, a controller 10b for controlling the operation of the body, a tuner 10d for extracting a television broadcast signal of a selected channel from television broadcast signals received through an unshown antenna, and outputting the television broadcast signal, an image processing section 10f for causing an image based on the television broadcast signal outputted from the tuner 10d to be displayed on the PDP module 30, a voice processing section 10h for causing voice based on the television broadcast signal outputted from the tuner 10d to be outputted from a speaker 10g, and a remote controller receiver section 10a for receiving a control command transmitted from a remote controller 10c.

The controller 10b, the tuner 10d, the image processing section 10f, the voice processing section 10h and the remote controller receiver section 10a are mounted, as circuits, on a main substrate which is mounted onto the back face of the PDP module 30.

The controller 10b is designed so as to control turning on/off of a power source, switching of channels, volume up/down, etc., according to the control command which is received through the remote controller receiver section 10a. Incidentally, an operating power is supplied to the respective sections of the panel type television 10 from an unshown power source circuit. An input of the power source circuit is a commercial power source (for example, AC100V).

Incidentally, while the present invention is discussed by taking the illustrated example in which the present invention is applied to the plasma television in which an image is adapted to be outputted from a plasma display, the present invention may be applied to a liquid crystal television in which an image is adapted to be outputted from a liquid crystal panel.

(2) STRUCTURE OF THE VERTICALLY EXTENDING BRIDGE FRAME

Figure 4:
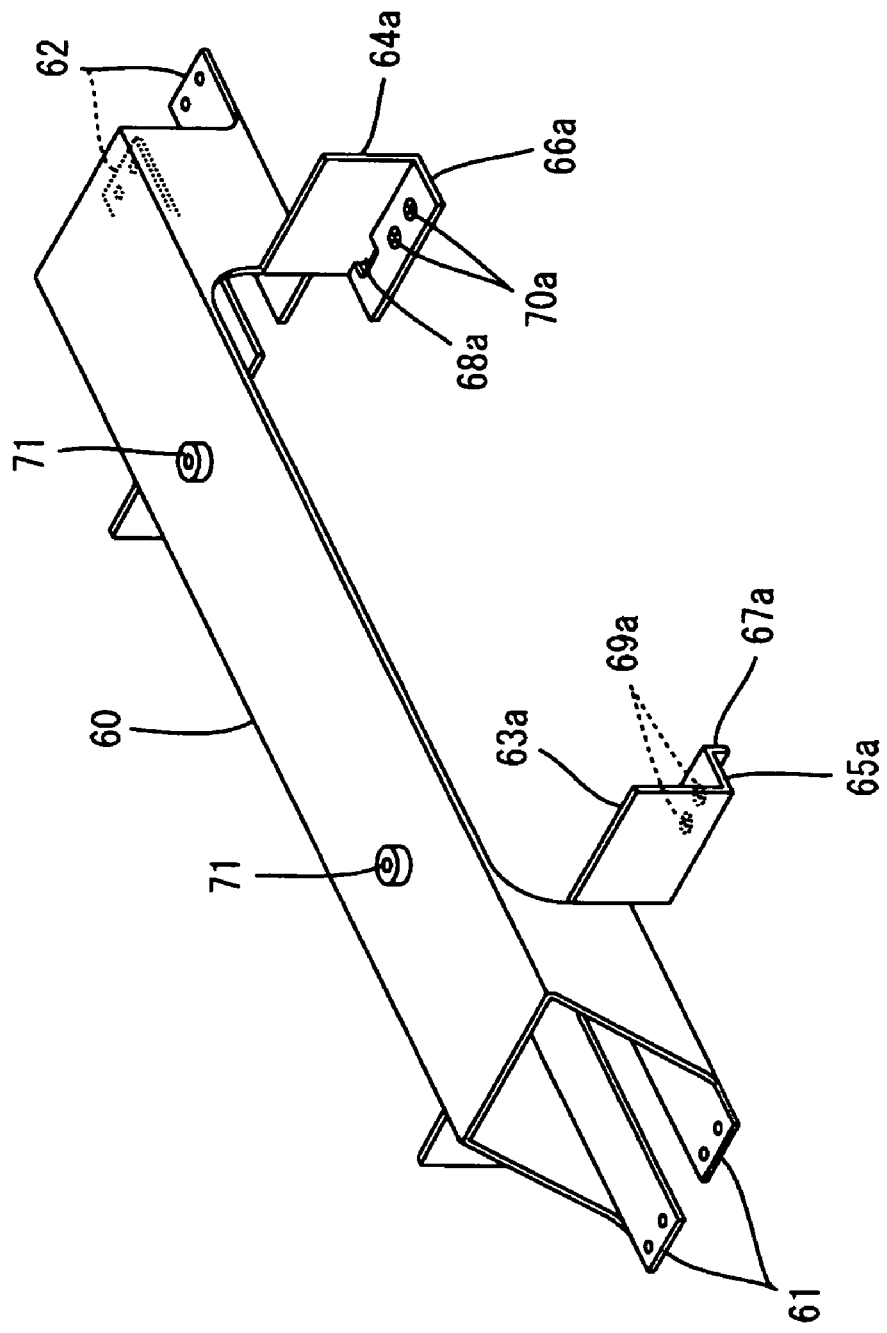
FIG. 4 is an exemplary illustration of a schematic perspective view of a vertically extending bridge frame.
Figure 5:
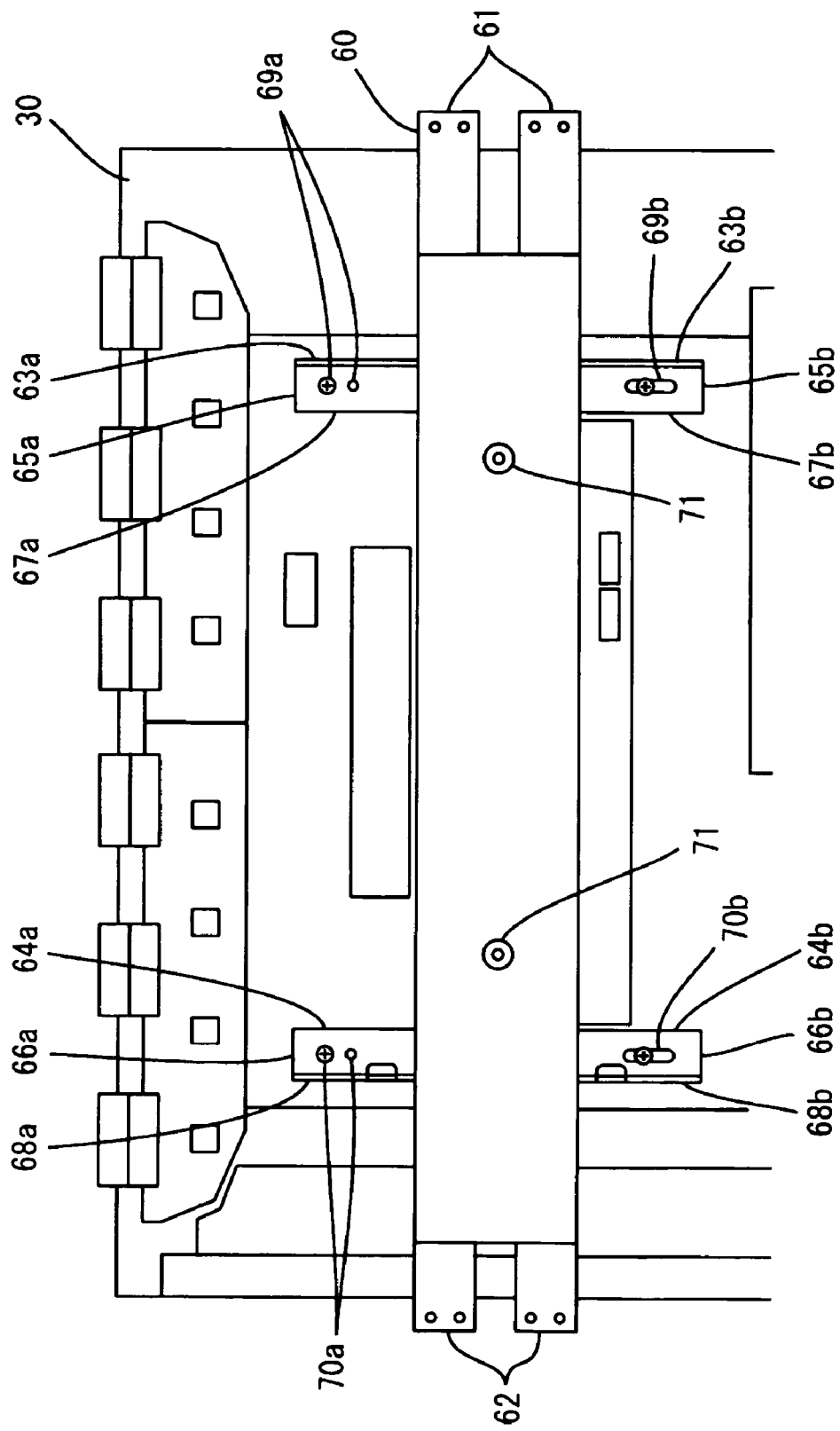
FIG. 5 is an exemplary illustration of a schematic rear side view of the vertically extending bridge frame.
Figure 6:
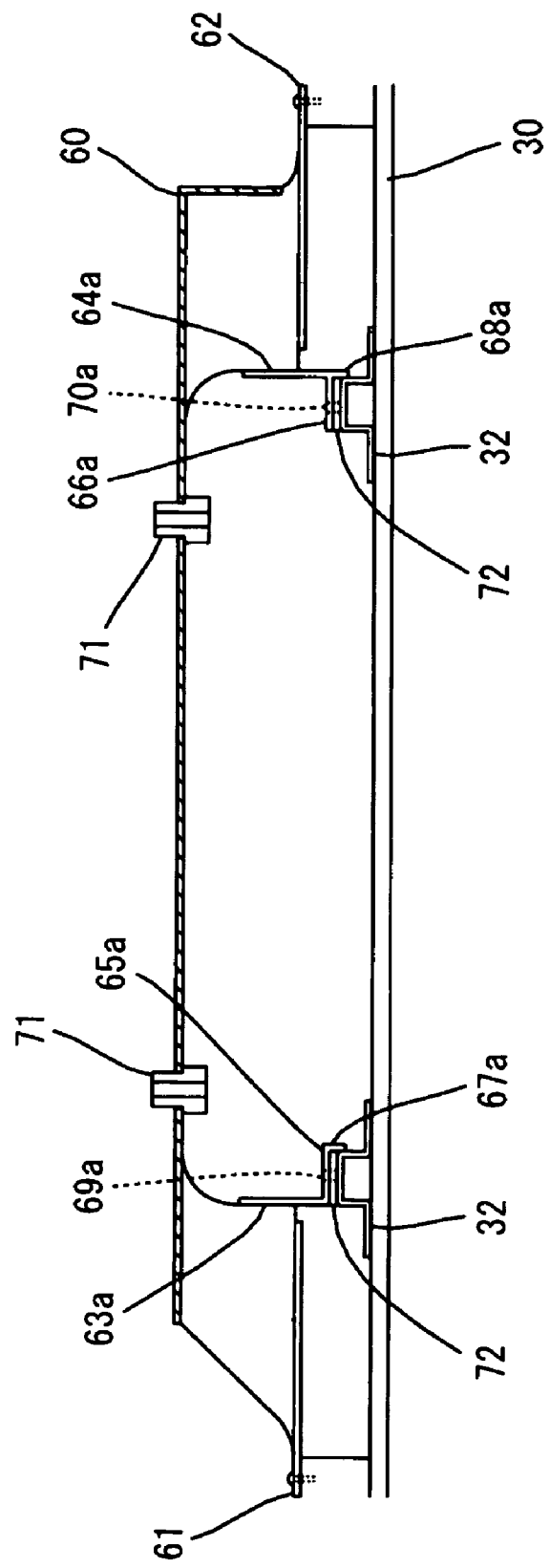
FIG. 6 is an exemplary illustration of a schematic partially sectional side view of the vertically extending bridge frame.
Figure 7:
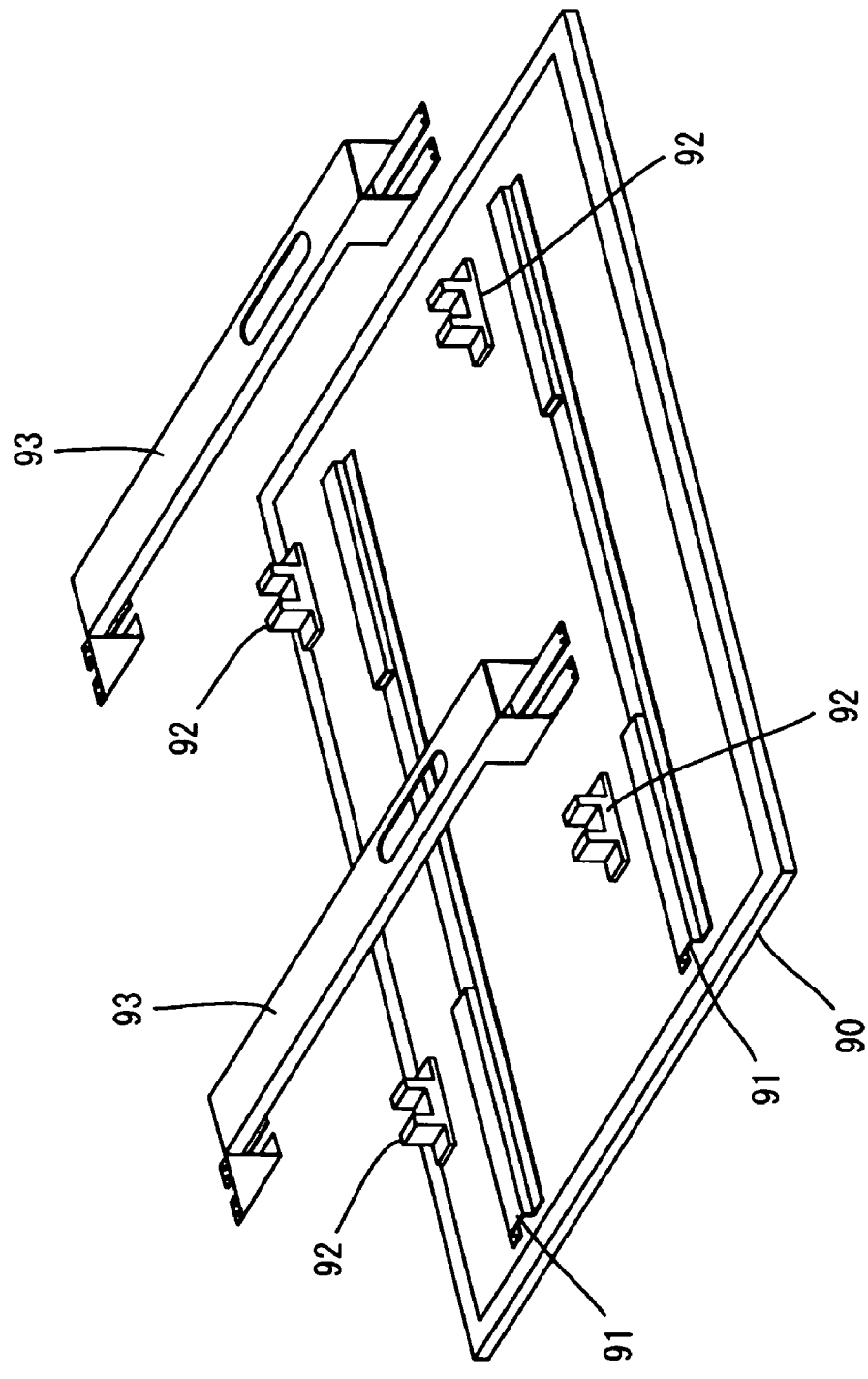
FIG. 7 is an exemplary illustration of a schematic exploded perspective view which is of assistance in explaining a conventional plasma television.

FIGS. 4, 5 and 6 are a schematic perspective view of the vertically extending bridge frame 60, a schematic rear side view of the vertically extending bridge frame 60, and a schematic partially sectional side view of the vertically extending bridge frame 60, respectively.

The vertically extending bridge frames 60 are both constructed in the same manner. More particularly, each of the vertically extending bridge frames 60 is formed into a substantially U-shape in cross-section by bending a metallic plate. The vertically extending bridge frame 60 is provided at the upper and lower portions thereof with upper fixing sections 61 and lower fixing sections 62. More particularly, the upper and lower fixing sections 61, 62 are formed by causing the left and right or both sides of the upper portion of the vertically extending bridge frame 60 and the left and right or both sides of the lower portion of the vertically extending bridge frame 60 to be inwardly bent so as to be substantially parallel to the back face of the PDP module. The upper fixing sections 61 have threaded holes formed in upper end portions thereof. Also, the lower fixing sections 62 have threaded holes formed in lower end portions thereof. The upper and lower fixing sections 61, 62 are screw-fastened to the upper and lower end portions of the rectangular frame 50 through the threaded holes, respectively.

The vertically extending bridge frame 60 is further provided at the left and right or both sides thereof with upper and lower protruding sections which are protruded in the left and right directions from the vertically extending bridge frame 60 so as to be substantially perpendicular to the sides of the vertically extending bridge frame 60. More particularly, the upper left protruding section 63a and the upper right protruding section 63b are formed by causing regions of the left and right sides of the vertically extending bridge frame 60 to be cut and rise up so as to be substantially perpendicular to the sides of the vertically extending bridge frame 60. Also, the lower left protruding section 64a and the lower right protruding section 64b are formed by causing regions of the left and right sides of the vertically extending bridge frame 60 to be cut and rise up so as to be substantially perpendicular to the sides of the vertically extending bridge frame 60.

The upper left protruding section 63a and the upper right protruding section 63b include an upper left screw-fixation section 65a and an upper right screw-fixation section 65b, respectively. The upper left screw-fixation section 65a and the upper right screw-fixation section 65b are formed by causing the upper left protruding section 63a and the upper right left protruding section 63b to be bent downwardly so as to be substantially parallel to the back face of the PDP module 30. Similarly, the lower left protruding section 64a and the lower right protruding section 64b include a lower left screw-fixation section 66a and a lower right screw-fixation section 66b, respectively. The lower left screw-fixation section 66a and the lower right screw-fixation section 66b are formed by causing the lower left protruding section 64a and the lower right protruding section 64b to be bent upwardly so as to be substantially parallel to the back face of the PDP module 30.

As shown in FIGS. 4 to 6, the upper left screw-fixation section 65a, the lower left screw-fixation section 66a, the upper right screw-fixation section 65b and the lower right screw-fixation section 66b are formed with threaded holes which are used for securing the vertically extending bridge frame 60 to the mounting members 32 by screws. In the illustrated example, the upper left screw-fixation section 65a is formed with two threaded round holes 69a that line up with each other on the left and right, and the lower left screw-fixation section 66a is formed with two threaded round holes 70a that line up with each other on the left and right. The upper right screw-fixation section 65b is formed with a threaded oblong hole 69b extending laterally. Also, the lower right screw-fixation section 66b is formed with a threaded oblong hole 70b extending laterally. Of course, all of the upper left and right screw-fixation sections 65a, 65b and the lower left and right screw-fixation sections 66a, 66b may be formed with two threaded round holes, may be each formed with a threaded oblong hole, and may be each formed with a combination of two threaded round hole and a threaded oblong hole.

Moreover, the upper left screw-fixation section 65a, the upper right screw-fixation section 65b, the lower left screw-fixation section 66a and the lower right screw-fixation section 66b are provided with projections 67a, 67b, 68a, 68b, respectively, which project so as to be substantially perpendicular to the back face of the PDP module 30. The projections 67a, 67b, 68a, 68b serve as both means to position the vertically extending bridge frame 60 and means to retain spacers 72 which are inserted between the vertically extending bridge frame 60 and the mounting members 32. Incidentally, it is unnecessary to always employ the spacers 72.

The projections 67a, 67b which are provided at the upper left screw-fixation section 65a and the upper right screw-fixation section 65b, respectively, are formed by causing tip end portions of the upper left and right screw-fixation sections 65a, 65 to be bent. The projections 68a, 68b which are provided at the lower left screw-fixation section 66a and the lower right screw-fixation section 66b, respectively, are formed by causing regions of the lower left and right screw-fixation sections 66a, 66b to be cut and causing the regions to be bent so as to lie on the same planes as rising-up regions of the lower left and right protruding sections 64a, 64b and continuously extend from the rising-up portions.

Left and right or both side portions except a rear portion of the vertically extending bridge frame 60 at the approximately middle portion of the longitudinal direction of the vertically extending bridge frame 60 are cut away, whereby a space communicating between the left and right sides of the vertically extending bridge frame 60 is provided. Thus, the space facilitates obtaining of a creeping distance from the substrate and the like which are mounted to the back face of the PDP module 30, and also facilitates easy mounting of the substrate and the like to the back face of the PDP module 30.

(3) SUMMARY

That is, the vertically extending bridge frame 60 are provided with the upper left protruding section 63a, the upper right protruding section 63b, the lower left protruding section 64a and the lower right protruding section 64b. The upper left screw-fixation section 65a, the upper right screw-fixation section 65b, the lower left screw-fixation section 66a and the lower right screw-fixation section 66b are formed by causing the upper left protruding section 63a, the upper right protruding section 63b, the lower left protruding section 64a and the lower right protruding section 64b to be bent, respectively. Thus, the vertically extending bridge frame 60 can be screw-fastened directly onto the back face of the PDP module 30.

Incidentally, it should be understood that the present invention is not limited to the particular embodiment described herein. It will be recognized by those skilled in the art that the combination of the above-mentioned elements and constructions replaceable with each other may be suitably changed.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

What is claimed is:

1. A panel type television comprising:
   a plasma display panel;
   a rectangular frame for supporting the plasma display panel, the rectangular frame being fixed to the plasma display panel so as to surround the plasma display panel on all sides including upper, lower, right and left sides of the plasma display panel; and
   two vertically extending bridge frames each formed into a substantially U-shape in cross-section by bending a metallic plate, the vertically extending bridge frames being fixed at upper and lower end portions thereof to upper and lower ends of the rectangular frame;
   each of the vertically extending bridge frames comprising:
   upper fixing sections formed by causing left and right sides of the upper portion of a vertically extending bridge frame to be inwardly bent so as to be substantially parallel to the back face of the plasma display panel, the upper fixing sections being formed with threaded holes through which the upper portion of the vertically extending bridge frame is fixed to the upper end of the rectangular frame;
   lower fixing sections formed by causing left and right sides of the lower portion of the vertically extending bridge frame to be inwardly bent so as to be substantially parallel to the back face of the plasma display panel, the lower fixing sections being formed with threaded holes through which the lower portion of the vertically extending bridge frame is fixed to the lower end of the rectangular frame;
   an upper left protruding section formed by causing a first region of a left side of the vertically extending bridge frame to be cut and causing the first region of the left side to rise up so as to be substantially perpendicular to the left side;
   an upper right protruding section formed by causing a second region of a right side of the vertically extending bridge frame to be cut and causing the second region of the right side to rise up so as to be substantially perpendicular to the right side;
   a lower left protruding section formed by causing a third region of the left side of the vertically extending bridge frame to be cut and causing the third region of the left side to rise up so as to be substantially perpendicular to the left side;
   a lower right protruding section formed by a causing a fourth region of the right side of the vertically extending bridge frame to be cut and causing the fourth region of the right side to rise up so as to be substantially perpendicular to the right side;
   an upper left screw-fixation section formed by causing the upper left protruding section to be bent downwardly so as to be substantially parallel to the back face of the plasma display panel, the upper left screw-fixation section being formed with a first threaded hole means;
   an upper right screw-fixation section formed by causing the upper right protruding section to be bent downwardly so as to be substantially parallel to the back face of the plasma display panel, the upper right screw-fixation section being formed with a second threaded hole means;
   a lower left screw-fixation section formed by causing the lower left protruding section to be bent upwardly so as to be substantially parallel to the back face of the plasma display panel, the lower left screw-fixation section being formed with a third threaded hole means; and
   a lower right screw-fixation section formed by causing the lower right protruding section to be bent upwardly so as to be substantially parallel to the back face of the plasma display panel, the lower right screw-fixation section being formed with a fourth threaded hole means.

2. A panel type television as defined in claim 1, wherein the first and third threaded hole means each comprise one of a group of first plural threaded round holes and a second threaded oblong hole, and the second and fourth threaded hole means each comprise the other of the group of first plural threaded round holes and the second threaded oblong hole.

3. A plasma television comprising:

a plasma display panel module displaying an image on a screen thereof;

a speaker outputting voice;

a main substrate for receiving of television broadcast signals, causing the image to be displayed on the screen of the plasma display panel module, and causing the voice to be outputted from the speaker;

a cabinet for housing the plasma display panel module and the speaker, the cabinet having a substantially rectangular window portion for allowing the screen of the plasma display panel module to be exposed therethrough;

a rectangular frame for supporting the plasma display panel module, the rectangular frame having a forward projecting peripheral step portion, and the rectangular frame being fixed to the plasma display panel module so as to surround the plasma display panel module on all sides including upper, lower, right and left sides of the plasma display panel module, with the peripheral step portion thereof being engaged with a peripheral edge portion of a front face of the plasma display panel module;

two vertically extending bridge frames each formed into a substantially U-shape in cross-section by bending a metallic plate, and formed in a rear side surface thereof with holes in which wall-mounting kits are to be fitted, the vertically extending bridge frames being arranged on the left and right sides of a back face of the plasma display panel and fixed at upper and lower end portions thereof to upper and lower ends of the rectangular frame; and spacers arranged between the back face of the plasma display panel module and the vertically extending bridge frames;

each of the vertically extending bridge frames comprising:

upper fixing sections formed by causing left and right sides of an upper portion of a vertically extending bridge frame to be inwardly bent so as to be substantially parallel to the back face of the plasma display panel module, the upper fixing sections being formed with threaded holes through which the upper portion of the vertically extending bridge frame is fixed to the upper end of the rectangular frame;

lower fixing sections formed by causing left and right sides of a lower portion of the vertically extending bridge frame to be inwardly bent so as to be substantially parallel to the back face of the plasma display panel module, the lower fixing sections being formed with threaded holes through which the lower portion of the vertically extending bridge frame is fixed to the lower end of the rectangular frame;

an upper left protruding section formed by causing a first region of a left side of the vertically extending bridge frame to be cut and causing the first region of the left side to rise up so as to be substantially perpendicular to the left side;

an upper right protruding section formed by causing a second region of a right side of the vertically extending bridge frame to be cut and causing the second region of the right side to rise up so as to be substantially perpendicular to the right side;

a lower left protruding section formed by causing a third region of the left side of the vertically extending bridge frame to be cut and causing the third region of the left side to rise up so as to be substantially perpendicular to the left side;

a lower right protruding section formed by a causing a fourth region of the right side of the vertically extending bridge frame to be cut and causing the fourth region of the right side to rise up so as to be substantially perpendicular to the right side;

an upper left screw-fixation section formed by causing the upper left protruding section to be bent downwardly so as to be substantially parallel to the back face of the plasma display panel module, the upper left screw-fixation section being formed with a first threaded hole means;

an upper right screw-fixation section formed by causing the upper right protruding section to be bent downwardly so as to be substantially parallel to the back face of the plasma display panel module, the upper right screw-fixation section being formed with a second threaded hole means;

a lower left screw-fixation section formed by causing the lower left protruding section to be bent upwardly so as to be substantially parallel to the back face of the plasma display panel module, the lower left screw-fixation section being formed with a third threaded hole means;

a lower right screw-fixation section formed by causing the lower right protruding section to be bent upwardly so as to be substantially parallel to the back face of the plasma display panel module, the lower right screw-fixation section being formed with a fourth threaded hole means; and projections for positioning the vertically extending bridge frame and retaining the spacers inserted between the vertically extending bridge frame and the back face of the plasma display panel module, the projections being provided at the upper left screw-fixation section, the upper right screw-fixation section, the lower left screw-fixation section and the lower right screw-fixation section so as to project substantially perpendicularly to the back face of the plasma display panel module;

the first and third threaded hole means each comprising one of a group of first plural threaded round holes and a second threaded oblong hole; and the second and fourth threaded hole means each comprising the other of the group of first plural threaded round holes and the second threaded oblong hole.

* * * * *